(12) United States Patent
Jones (10) Patent No.: US 8,997,369 B2
(45) Date of Patent: Apr. 7, 2015

(54) FAST ROTARY DRIVE FOR A HANDHELD MICROMETER

(75) Inventor: Benjamin Keith Jones, Seattle, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 569 days.

(21) Appl. No.: 13/472,439

(22) Filed: May 15, 2012

(65) Prior Publication Data

US 2013/0305858 A1    Nov. 21, 2013

(51) Int. Cl.
*G01B 3/18* (2006.01)

(52) U.S. Cl.
CPC .............. *G01B 3/18* (2013.01); *Y10T 74/18664* (2015.01)

(58) Field of Classification Search
CPC ............ F16H 25/00; F16H 57/08; G01B 3/18
USPC ........... 33/813, 823, 828, 832, 833, 281, 296, 33/374–376, 382–383, 518, 613, 815–816, 33/819, 831, 706–707, 712, 783–784, 33/787; 74/89.34; 324/662; 475/1, 331, 475/343, 149
See application file for complete search history.

(56) References Cited

U.S. PATENT DOCUMENTS

| | | | |
|---|---|---|---|
| 1,132,704 A | 3/1915 | Coes | |
| 3,849,890 A | 11/1974 | Jeannet | |
| 4,485,556 A | 12/1984 | Sakata | |
| 4,561,185 A | 12/1985 | Sakata | |
| 5,495,677 A | 3/1996 | Tachikake | |
| 6,247,244 B1 * | 6/2001 | Zanier et al. | 33/819 |
| 6,308,433 B1 * | 10/2001 | Takahashi et al. | 33/819 |
| 6,915,591 B2 * | 7/2005 | Hayashida et al. | 33/815 |
| 8,091,251 B1 | 1/2012 | Zhang | |

* cited by examiner

*Primary Examiner* — R. A. Smith
*Assistant Examiner* — Tania Courson
(74) *Attorney, Agent, or Firm* — Christensen O'Connor Johnson Kindness PLLC (57) ABSTRACT

A micrometer drive configuration for a handheld micrometer comprises: a frame; a spindle; a linear displacement sensor that senses a displacement of the spindle; a threaded spindle drive having a relatively coarse thread pitch, wherein the threaded spindle drive is attached to a spindle drive gear; a planetary drive gear that mates to the spindle drive gear; a ring gear surrounding and mating to the planetary drive gear; and a thimble generally surrounding the spindle drive gear, the planetary drive gear, and the ring gear. The thimble is coupled to drive the spindle drive gear through the planetary drive gear, and the planetary drive gear is sized and mounted such that the spindle drive gear turns faster than the thimble.

8 Claims, 7 Drawing Sheets

FAST ROTARY DRIVE FOR A HANDHELD MICROMETER

FIELD

The present disclosure relates generally to handheld micrometers, and more specifically, a handheld micrometer with a fast rotary drive for moving a spindle into contact with a workpiece.

BACKGROUND

Various micrometer devices are known in the art for performing high precision measurements of workpieces using a handheld mechanism. For example, U.S. Pat. Nos. 1,132,704; 3,849,890; 4,485,556; 4,561,185; and 8,091,251 (referred to herein as the '704, '890, '556, '185 and '251 patents), each of which is hereby incorporated by reference in its entirety, disclose micrometer devices. In particular, modern micrometers such as that disclosed in U.S. Pat. No. 5,495,677 (the '677 patent) comprise a linear digital sensor for determining measurements, rather than relying on accurate micrometer threads in combination with a rotary position sensing device. Using a linear digital sensor eliminates the need to use accurate or fine pitch threads in order to drive the micrometer. For example, the '677 patent uses very coarse drive threads, and the '251 patent copies features of known spring-loaded gauge designs that use no drive threads.

However, the micrometer designs referred to above lack certain desirable features of traditional fine-pitch thread-driven micrometers. In order to provide ergonomic, rapid, and convenient functionality for users, there is a need for a micrometer which quickly drives a spindle to a desired position with limited motion on the part of the user, which also provides other desired features.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

As previously noted, the micrometer designs referred to above lack certain desirable features of traditional fine-pitch thread-driven micrometers. For example, the '251 patent design is spring loaded and does not provide good stiffness or resistance when the reference surfaces of the micrometer are adjusted to the workpiece. As a result, the user cannot manually sense that the micrometer is engaging the workpiece at the "minimum dimension" cross section, for example. For example, if a workpiece having a cam-shaped cross section is rotated in the device, little resistance is offered by the micrometer, and it will simply change its reading to the current dimension. In contrast, a traditional fine-pitch thread drive micrometer can be adjusted to a particular dimension across the workpiece, and rotation of the workpiece will either be met with substantial resistance or substantial freedom as the workpiece dimension deviates from a current micrometer gap. This provides manual feedback that is sensed by a user to rapidly adjust the micrometer to the maximum or minimum dimension on the workpiece, for example. In addition, once set, the micrometer reading is stable without the need for electronic sample and hold circuits or the like. The '677 patent uses a very coarse pitch thread to directly drive the micrometer. This is better than the design of the '251 patent with respect to reading stability and "feel," but still does not provide the desirable "engagement stiffness" or feel of traditional fine pitch micrometer drives.

Disclosed herein is a micrometer drive configuration for a handheld micrometer than combines a desirable level of engagement stiffness or feel with the ability to quickly drive a spindle to a desired position with limited motion on the part of the user. In various embodiments, the micrometer drive comprises: a frame; a spindle; a linear displacement sensor that senses the displacement of the spindle; a threaded spindle drive, the threaded spindle drive attached to a spindle drive gear; a planetary drive gear that mates to the spindle drive gear; a ring gear surrounding and mating to the planetary drive gear; and a thimble generally surrounding the spindle drive gear, the planetary drive gear, and the ring gear. The thimble is coupled to drive the spindle drive gear through the planetary drive gear, and the planetary drive gear is sized and mounted such that the spindle gear turns faster than the thimble. The spindle drive gear, the planetary drive gear, and the ring gear may be referred to as an epicyclic gear drive, or an epicyclic drive, for short. Generally speaking, one advantage of this configuration is that it does not need a very coarse spindle drive thread pitch such as that used in the '677 patent to drive the spindle rapidly in relation to a turn of the thimble. Rather, the epicyclic drive rotates the spindle drive at a higher rate than the thimble (e.g., at a ratio of four turns of the spindle drive for one turn of the thimble), such that it may be combined with a spindle drive thread pitch finer than that used in the device of the '677 patent, yet provide the same spindle advance in relation to turns of the thimble. This may provide certain ergonomic or reliability improvements, including the self-locking feature outlined below, for example. Conversely, the spindle drive thread pitch used in the '677 patent could provide an even faster spindle advance if used in combination with the epicyclic drive configuration disclosed herein. In some embodiments, the ring gear may be coupled to the thimble and may rotate at the rate of the thimble, and the planetary drive gear may be fixed to the frame at a rotary axis of the planetary drive gear.

In some embodiments, the ring gear may be fixed to the frame, and a rotary axis of the planetary drive gear may be coupled to the thimble and may rotate at the rate of the thimble.

In some embodiments, the rotation of spindle drive gear in relation to the rotation of the thimble may operate at a "gear ratio" as high as 3:1, 4:1, 5:1, a 6:1, or more.

In some embodiments, the spindle drive may have a thread configured such that the spindle drive will not turn in response to compressive forces applied by a measured workpiece to the spindle; that is, the spindle drive is configured to be "self-locking" in this sense. In some embodiments, the spindle drive may comprise threads with a lead angle $\lambda$ (which corresponds to the thread pitch) and a thread angle $\alpha_n$, measured in a plane parallel to the drive axis and relative to a plane normal to the drive axis (which corresponds to the thread surface taper along a radial direction). The spindle drive thread(s) may be made of materials that provide an effective coefficient of static friction $\mu$. The lead angle $\lambda$, the thread angle $\alpha_n$, and the coefficient of static friction $\mu$ may be designed to satisfy the relation: $\mu > \cos \alpha_n \tan \lambda$, such that the spindle drive is "self-locking."

In some embodiments, the spindle drive may engage to drive the spindle along external threads on the spindle drive. In other embodiments, the spindle drive gear may engage to drive the spindle along internal threads on the spindle drive.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
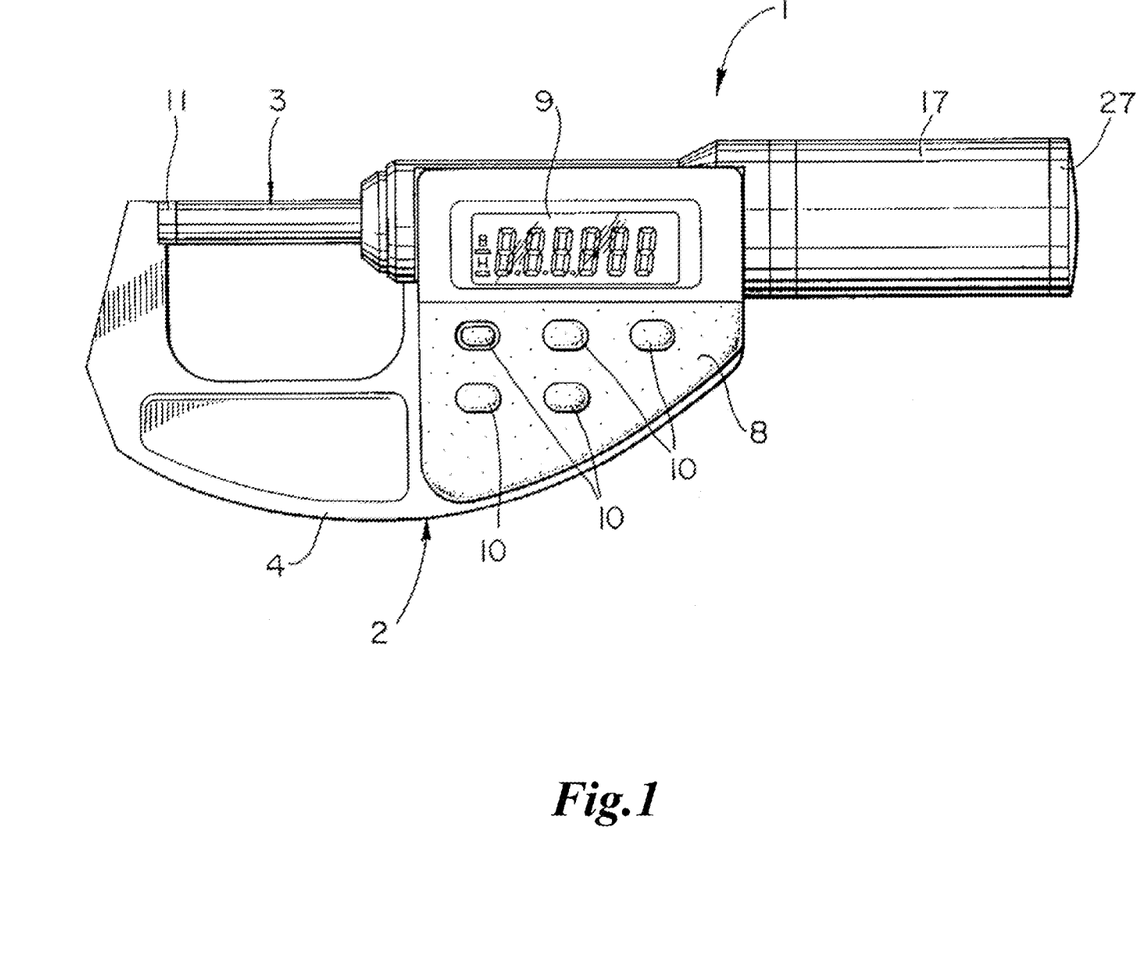
FIG. 1 is a diagram of a basic micrometer which may be adapted to the principles disclosed herein.

FIG. 1 is a diagram of a basic micrometer which may be adapted to the principles disclosed herein. The micrometer of FIG. 1 may incorporate elements of the commonly assigned '677 patent and may additionally be adapted to comprise elements described in FIGS. 3 through 7.

In FIG. 1, a digital display micrometer gauge 1 has a main body 2 formed as a closed, water/dust-proof structure. A spindle 3 is adapted to project from and retract into main body 2. A cover member 8, seen in FIG. 1, is provided on the front surface of U-shaped main frame 4. A digital display device 9 and a plurality of operating switches 10 are provided on the front surface of cover member 8.

The U-shaped main frame 4 has two outwardly extending ends defining an opening with an anvil 11 disposed at one of the ends as seen in FIG. 1. At the other end of main frame 4, spindle 3 is supported such that it can be axially displaced by turning a thimble 17. One end of spindle 3 is adapted to abut against anvil 11. An end cap 27 may cover the end of thimble 17 and/or its contents.

Figure 2:
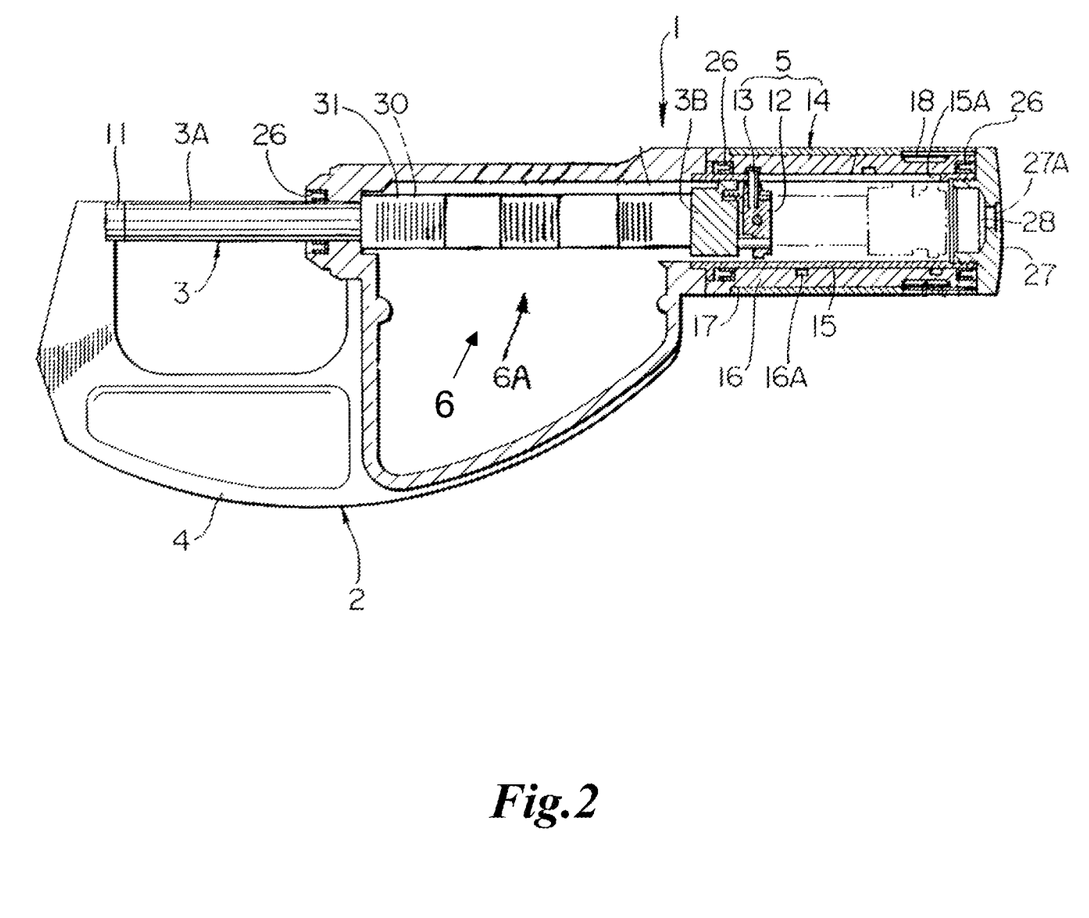
FIG. 2 is a cut-away diagram of the micrometer gauge shown in FIG. 1, showing further details.

FIG. 2 is a cut-away diagram of the micrometer gauge 1 shown in FIG. 1, showing further details. As seen in FIG. 2, main body 2 includes a U-shaped main frame 4, a spindle driving mechanism 5 (spindle drive for short) for causing spindle 3 to advance and retreat, and a position transducer 6 for detecting the displacement amount of spindle 3. Position transducer 6 is a linear encoder, arranged inside U-shaped main frame 4 through the intermediation of gap control mechanism 7 (not shown) and a main scale 31. Main scale 31 is arranged on spindle body 3A through the intermediation of a scale mounting member 30.

Position transducer 6 is connected to digital display device 9, shown in FIG. 1, through conventional electric devices, such as a counter and CPU (not shown). The position transducer 6 employs a photoelectric-type encoder 6A as schematically seen in FIG. 2. For example, the photoelectric-type encoder disclosed in U.S. Pat. No. 5,026,164 could be employed, this disclosure being incorporated herein by reference. The position transducer 6 may also employ a capacitive or inductive-type encoder in alternative embodiments.

In the embodiment shown in FIG. 2, spindle driving mechanism 5 comprises a stopper 12 attached to the other end of slide member 3B of spindle 3, a pin-like engagement member 13 attached to stopper 12, and an engagement member driving mechanism 14 for causing engagement member 13 to advance and retreat along the axial direction of spindle 3. Engagement member driving mechanism 14 comprises an inner sleeve 15 and an outer sleeve 16. One end of inner sleeve 15 is secured to U-shaped frame 4 and has a slit 15A into which engagement member 13 is inserted extending along the axial direction of spindle 3. Outer sleeve 16 fits onto the outer periphery of inner sleeve 15 to be circumferentially rotatable and has in the inner peripheral section thereof a spiral groove 16A that engages with engagement member 13. The spiral groove 16A is one embodiment of a spindle drive thread as outlined in greater detail below. A thimble 17 rotatably fits onto the outer peripheral surface of outer sleeve 16. Two plate springs 18 are arranged between thimble 17 and outer sleeve 16. When thimble 17 is rotated in one direction, the torque of this rotation is transmitted to spindle 3 through plate springs 18, spiral groove 16A of outer sleeve 16, and engagement member 13. Thereby, spindle 3 advances toward anvil 11. Rotating thimble 17 in the other direction causes spindle 3 to retreat. Spiral groove 16A has a relatively large or coarse pitch. Specifically, it is larger than the screw pitch of a conventional micrometer.

Slide member 3B of spindle 3 is slidably supported in inner sleeve 15 and contacts inner sleeve 15 about the periphery of spindle 3. When spindle 3 moves away from anvil 11, spindle body 3A, on which main scale 31 is provided, is inserted into inner sleeve 15, as indicated by the imaginary line of FIG. 2.

As shown in FIG. 2, ring-like seal members 26 are respectively provided between spindle 3 and U-shaped frame 4 and between inner sleeve 15 and outer sleeve 16. An end cap 27 is threadedly engaged with the open end portion of inner sleeve 15. End cap 27 has an opening 27A through which the interior of gauge body 2 communicates with the exterior atmosphere.

A porous member 28 closes opening 27A and is attached to the inner side of end cap 27. Porous member 28 preferably consists of a synthetic resin filter (for example, OLEO VENTIFILTER (product name) manufactured by GORE-TEX), which allows transmission of gas but not of liquid or solid. Whereby, it is possible to prevent changes in the pneumatic pressure of the closed space inside U-shaped frame 4 when spindle 3 moves in and out.

Figure 3:
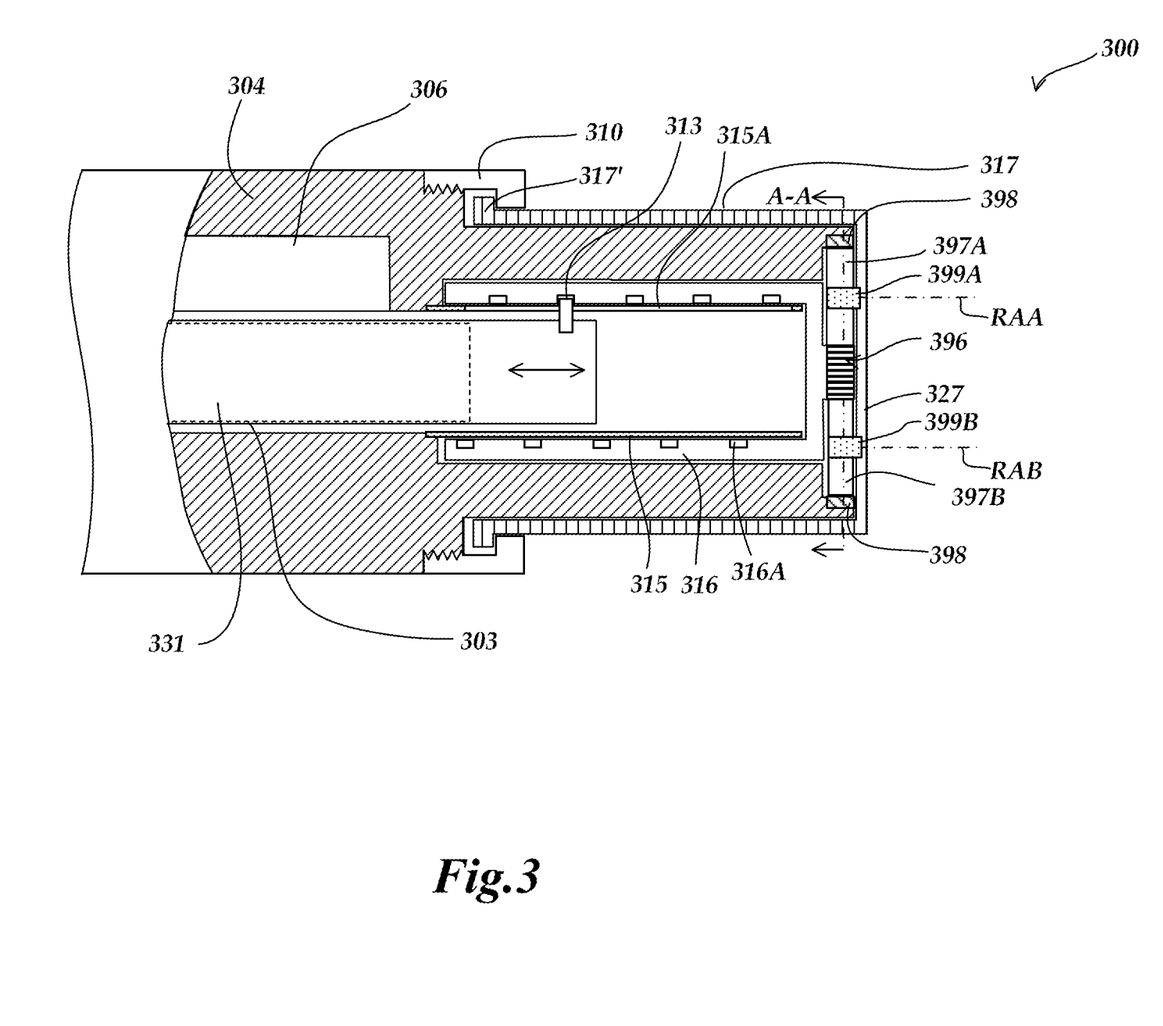
FIG. 3 is a cross-section diagram of a portion of a first embodiment of a micrometer analogous to that shown in FIGS. 1 and 2, adapted to the principles disclosed herein, including a first embodiment of an epicyclic spindle drive.

FIG. 3 is a cross-section diagram of a portion of a first embodiment of a micrometer 300 adapted to the principles disclosed herein, including a first embodiment of an epicyclic spindle drive. It will be understood that portions of the micrometer not shown in FIG. 3 may be implemented in some embodiments as previously described in relation to FIGS. 1 and 2, or according to other teachings found in the incorporated references and/or according to techniques generally known to one of ordinary skill in the art. In many cases, elements numbered 3XX in FIG. 3, may provide functions analogous to elements numbered XX in FIGS. 1 and 2, and may be understood by analogy, such that only significant differences are described herein.

As shown in FIG. 3, the illustrated portion of the micrometer 300 comprises a spindle 303 with an attached engagement member 313, a frame 304, a frame sleeve portion 315 fixed relative to the frame 304 including a slot 315A, a linear displacement sensor 306 which reads the position of a scale 331 mounted to the spindle 303, an internally threaded spindle drive 316 that includes an internal spindle drive thread 316A and that is joined to and turned by a spindle drive gear 396, planetary drive gears 397A, 397B, and 397C (not visible), a ring gear 398, a thimble 317, and an end cap 327. The thimble 317 includes a flange 317' which allows the thimble to be retained by a retaining ring 310. The linear displacement sensor 306 may comprise a capacitive, inductive or optical position sensor with a cooperative scale 331. The ring gear 398 is fixed relative to the frame 304 in this embodiment; such that it does not rotate, and it surrounds and mates to the planetary drive gears 397A, 397B, and 397C. The planetary gears mate to the spindle drive gear 396 on the end of the spindle drive 316. The planetary drive gears 397A, 397B, and 397C are mounted on axles 399A, 399B, and 399C, respectively, which are fixed to the end cap 327 in this embodiment. The thimble 317 generally surrounds the spindle drive 316, the planetary drive gears 397A, 397B, and 397C, and the ring gear 398. The end cap is fixed to or integral with the thimble 317 such that the planetary drive gear axles 399A, 399B, and 399C and the planetary drive gears 397A, 397B, and 397C are forced to follow a circular path as the thimble 317 and end cap 327 rotate. Since the planetary drive gears 397A, 397B, and 397C mate to the fixed ring gear 398, this forces the planetary drive gears to rotate about their axles, and this planetary drive gear rotation drives the mating spindle drive gear 396 which rotates the attached spindle drive 316.

The spindle drive 316 comprises spindle drive threads 316A (e.g., as provided by a spiral groove) which mate to and drive the engagement member 313, to drive the spindle 303 in a manner analogous to that previously described with reference to FIG. 2.

In the embodiment shown in FIG. 3, the spindle drive 316 includes an internal spindle drive thread 316A to engage and drive an element attached to the spindle 303 (e.g., the engagement member 313). In other embodiments such as those outlined further below, the spindle drive includes an external spindle drive thread to engage and drive an element attached to the spindle. It will be appreciated that in various embodiments disclosed herein, although the spindle drive thread X16A is illustrated as a spiral groove and the engagement member X13 of the spindle is illustrated as a mating pin, the spiral groove X16A may be replaced by any operable screw thread form, and the engagement member X13 may be replaced by a mating operable screw thread form, or the like.

It will be appreciated that FIG. 3 is a partially schematic representation of the illustrated elements. For example, some of the gaps between elements are exaggerated to ease the recognition of the various elements; whereas, in an actual device, there may be a sliding interface or bearing between the elements to provide precise alignment and stability and smooth operation. Similarly, sealing and vent features, and some elements included in the spindle driving mechanism 5 shown in FIG. 2, have not been included in order to better illustrate and emphasize the novel features of the invention. However, it will be appreciated that such elements may be included in an actual device.

Figure 4:
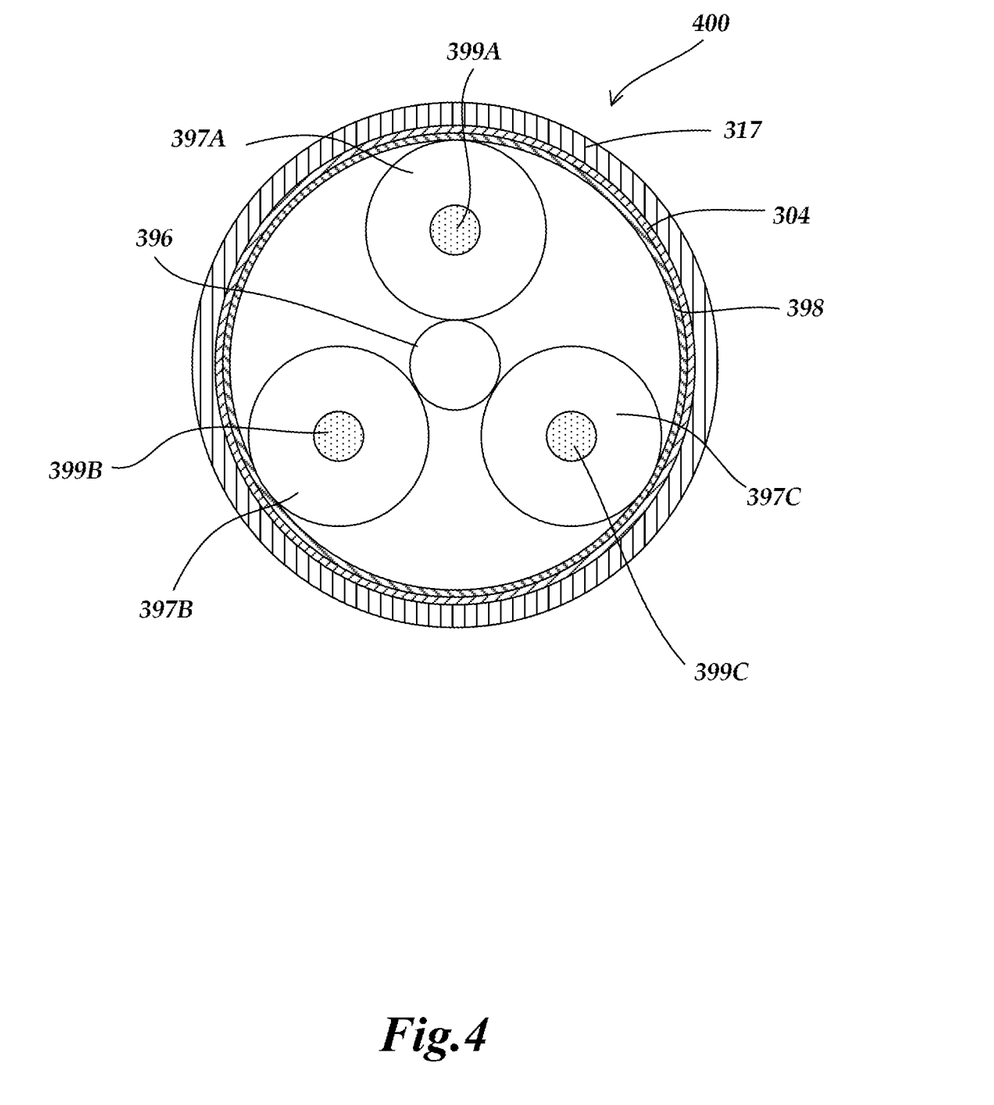
FIG. 4 is a cross-section diagram of the micrometer of FIG. 3, illustrating the first embodiment of an epicyclic gear drive from an axial direction.

FIG. 4 is a cross-section diagram 400 of the micrometer 300 along the line A-A of FIG. 3, illustrating the first embodiment of an epicyclic gear drive from an axial direction. It will be appreciated that the ring gear 398, the planetary drive gears 397A, 397B, and 397C, and the spindle drive gear 396 are sized and mounted such that the spindle gear 396 and its attached spindle drive 316 turn faster than the thimble 317. In one embodiment similar to that shown in FIG. 4, the ring gear 398 may have 5 times the diameter and comprises 5 times as many teeth as the spindle drive gear 396. In such an embodiment, one rotation of the thimble 317 provides one circular path "orbit" of the planetary gears and provides six rotations of the spindle drive gear 396.

In general, embodiments where the axles of the planetary gears 397A, 397B, and 397C are coupled to the thimble 317 (e.g., through the end cap 327), the ring gear 398 has a number of gear teeth $N_R$, and the spindle drive gear 396 has a number of gear teeth $N_S$, the turning ratio R of the spindle drive relative to the thimble may then be determined according to the relation:

$$R = 1 + \frac{N_R}{N_S} \quad \text{(Eq.1.)}$$

Figure 7:
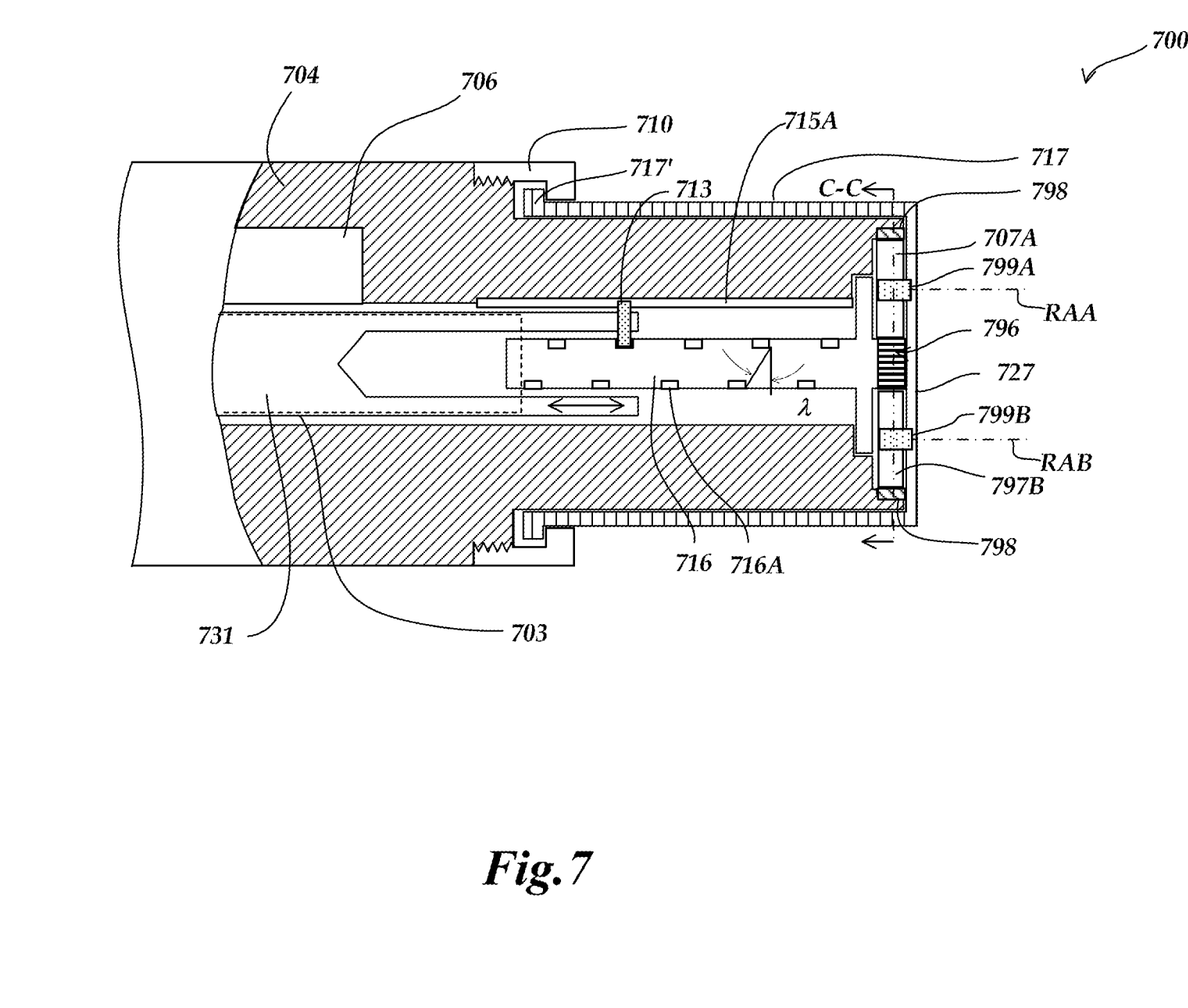
FIG. 7 is a cross-section diagram of a portion of a micrometer adapted to the principles disclosed herein, including a third embodiment of an epicyclic spindle drive.

An additional embodiment, including planetary gears coupled to the thimble, is shown in FIG. 7.

Figure 5A:
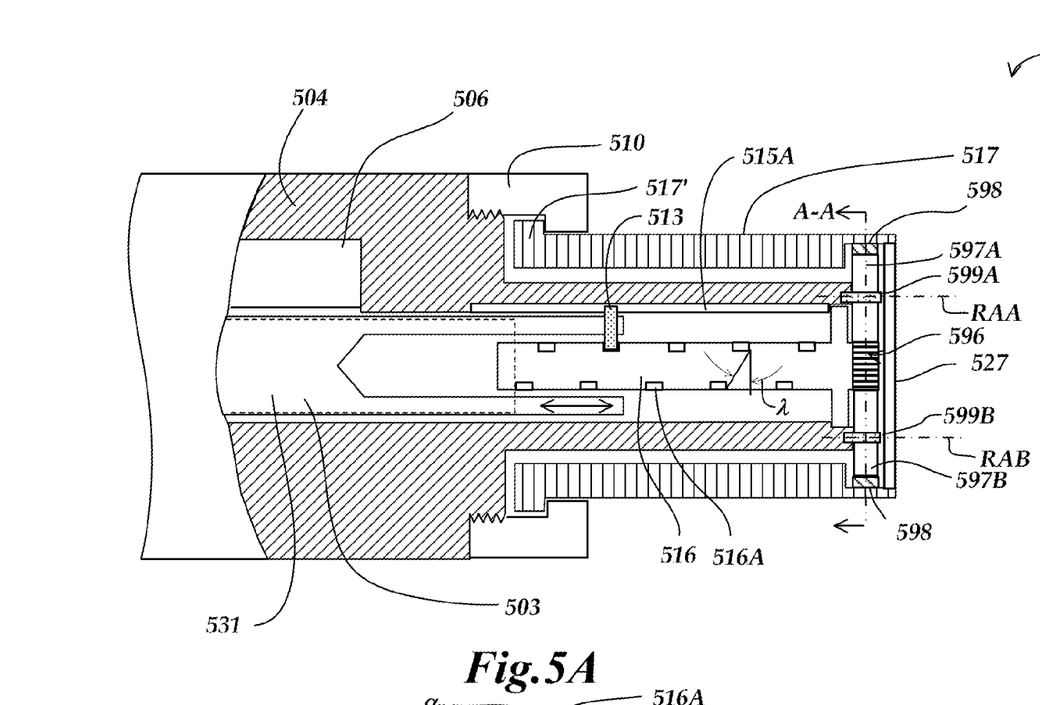
FIG. 5A is a cross-section diagram of a portion of a micrometer adapted to the principles disclosed herein, including a second embodiment of an epicyclic spindle drive.
Figure 5B:
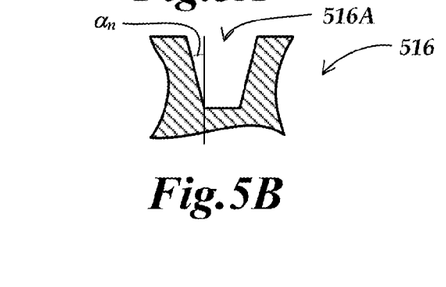
FIG. 5B is a detail diagram showing a thread parameter related to threads on the spindle drive shown in FIG. 5A.

FIG. 5A is a cross-section diagram of a portion of a first embodiment of a micrometer 500 adapted to the principles disclosed herein including a second embodiment of an epicyclic spindle drive, and FIG. 5B is a detail diagram showing a thread parameter related to spindle drive threads in various embodiments disclosed herein. It will be understood that portions of the micrometer not shown in FIGS. 5A and 5B may be implemented in some embodiments as previously described in relation to FIGS. 1 and 2 or according to other teachings found in the incorporated references and/or according to techniques generally known to one of ordinary skill in the art. In many cases, elements numbered 5XX in FIGS. 5A and 5B may provide functions analogous to elements numbered XX in FIGS. 1 and 2 or 3XX in FIG. 3 and may be understood by analogy, such that only significant differences are described herein. It will be appreciated that FIGS. 5A and 5B are a partially schematic representation of the illustrated elements. For example, some of the gaps between elements are exaggerated to ease the recognition of the various elements; whereas, in an actual device, there may be a sliding interface or bearing between the elements to provide precise alignment and stability and smooth operation. Similarly, sealing and vent features, and some elements included in the spindle driving mechanism 5 shown in FIG. 2 have not been included in order to better illustrate and emphasize the novel features of the invention. However, it will be appreciated that such elements may be included in an actual device.

As shown in FIGS. 5A and 5B, the illustrated portion of the micrometer 500 comprises a spindle 503 with an attached engagement member 513, a frame 504, a slot 515A, a linear displacement sensor 505 which reads the position of a scale 531 mounted to the spindle 503, an externally threaded spindle drive 506 that includes an external spindle drive thread 516A and that is joined to and turned by a spindle drive gear 596, planetary drive gears 597A, 597B, and 597C (not visible), a ring gear 598, a thimble 517, and an end cap 527. The thimble 517 includes a flange 517' which allows the thimble to be retained by a retaining ring 510. The linear displacement sensor 505 may comprise a capacitive, inductive, or optical position sensor with a cooperative scale 531. The ring gear 598 is fixed to the thimble 517 in this embodiment such that it rotates with the thimble 517, and it surrounds and mates to the planetary drive gears 597A, 597B, and 597C. The planetary gears mate to the spindle drive gear 596 on the end of the spindle drive 516. The planetary drive gears 597A, 597B, and 597C are mounted on axles 599A, 599B, and 599C, respectively, which are fixed to the frame 504 in this embodiment. The thimble 517 generally surrounds the spindle drive 516, the planetary drive gears 597A, 597B, and 597C and the ring gear 598. The end cap may be fixed to the thimble 517. Since the planetary drive gears 597A, 597B, and 597C mate to the ring gear 598, rotation of the ring gear with the thimble 517 forces the planetary drive gears to rotate about their fixed axles, and this planetary drive gear rotation drives the mating spindle drive gear 596 which rotates the attached spindle drive 516.

The spindle drive 516 comprises spindle drive threads 516A (e.g., as provided by a spiral groove) which mate to and drive the engagement member 513, to drive the spindle 503 in a manner analogous to that previously described with reference to FIGS. 2 and 3. In the embodiment shown in FIGS. 5A and 5B, the spindle drive 516 includes an external spindle drive thread 516A to engage and drive an element attached to the spindle 503 (e.g., the engagement member 513). It will be appreciated that in various embodiments disclosed herein, although the spindle drive thread X16A is illustrated as spiral groove and the engagement member X13 of the spindle is illustrated as a mating pin, the spiral groove X16A may be replaced by any operable screw thread form, and the engagement member X13 may be replaced by a mating operable screw thread form, or the like.

The spindle drive threads 516A comprise a lead angle λ. As shown in FIG. 5B, the thread profile may comprise a thread angle $\alpha_n$, measured relative to the normal. The spindle drive threads 516A and the engagement member 513 may have an effective coefficient of static friction μ. In order to provide a self-locking capability, the lead angle λ, the thread angle $\alpha_n$, and the effective coefficient of static friction μ must satisfy the relation:

$$\mu > \cos\alpha_n \tan\lambda \quad (\text{Eq.2.})$$

In embodiments where the spindle drive threads 516A have perpendicular sides (e.g., are square threads), $\cos\alpha_n$ may be taken as unity and the relation simplifies to:

$$\mu > \tan\lambda \quad (\text{Eq.3.})$$

The foregoing relations show that when the lead angle is large (e.g., in order to provide rapid spindle motion), the tangent of the lead angle becomes large, and a large coefficient of friction is needed in order for the spindle to be "self locking" against measurement forces exerted by the workpiece. However, large friction is undesirable from an ergonomic standpoint, since it will make it more difficult to turn the thimble. It will be appreciated that one advantage of the epicyclic drive configurations disclosed herein is that they do not need a very coarse spindle drive thread pitch, such as that used in the '677 patent, to drive the spindle rapidly in relation to a turn of the thimble. Rather, the epicyclic drive rotates the spindle drive at a higher rate than the thimble (e.g., at a ratio of four turns of the spindle drive for one turn of the thimble), such that it may be combined with a spindle drive thread pitch finer than that used in the device of the '677 patent, yet provide the same spindle advance in relation to turns of the thimble. This may provide certain ergonomic or reliability improvements, including the self-locking feature, for example. Conversely, the spindle drive thread pitch used in the '677 patent could provide an even faster spindle advance if used in combination with the epicyclic drive configurations disclosed herein.

It will be appreciated that various features of the embodiments of FIG. 3 and FIG. 5A may be combined in a further embodiment, such that the spindle and spindle drive of FIG. 3 (including internal spindle drive threads) may be driven by an epicyclic gear configuration similar to that shown in FIGS. 5A and 5B, wherein the ring gear rotates with the thimble, and the planetary drive gear axles are fixed to the frame.

Figure 6:
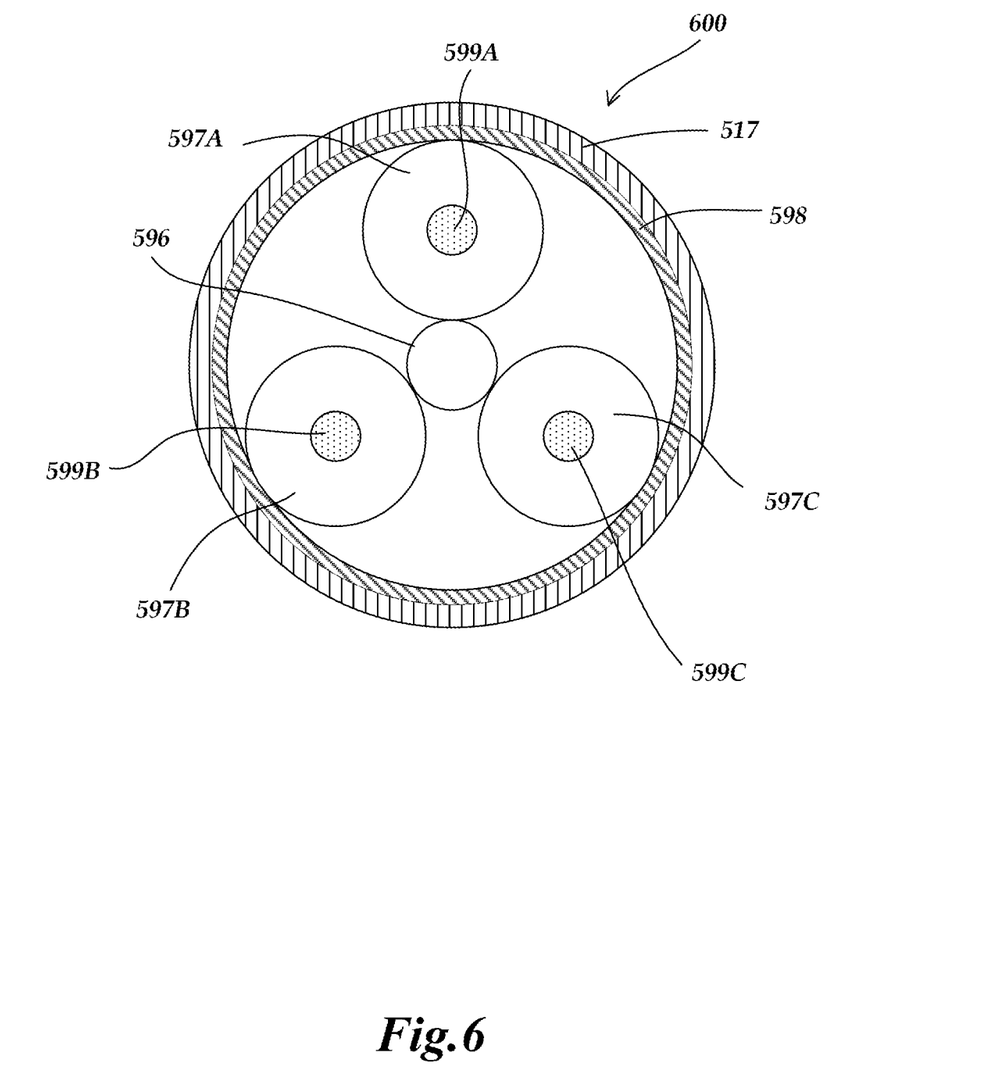
FIG. 6 is a cross-section diagram of the micrometer of FIG. 5A illustrating the second embodiment of an epicyclic spindle drive from an axial direction.

FIG. 6 is a cross-section diagram of the micrometer 500 along the line A-A of FIG. 5A, illustrating the second embodiment of an epicyclic gear drive from an axial direction. It will be appreciated that the ring gear 598, the planetary drive gears 597A, 597B, and 597C, and the spindle drive gear 596 are sized and mounted such that the spindle gear 596 and its attached spindle drive 516 turn faster than the thimble 517. In one embodiment similar to that shown in FIG. 6, the ring gear 598 may have 5 times the diameter and comprises 5 times as many teeth as the spindle drive gear 596. In such an embodiment, one rotation of the thimble 517 provides one rotation of the ring gear and provides five rotations of the spindle drive gear 596.

In general, in embodiments where the ring gear is fixed to the thimble and the axles of the planetary gears 597A, 597B, and 597C are fixed to the frame, and the ring gear 598 has a number of gear teeth $N_R$ and the spindle drive gear 596 has a number of gear teeth $N_S$, the turning ratio R of the spindle drive relative to the thimble may then be determined according to the relation:

$$R = \frac{N_R}{N_S} \quad (\text{Eq.4.})$$

It should be appreciated, that the micrometer 500 comprises three planetary drive gears, but this is exemplary only and not limiting. An embodiment of a micrometer adapted to the principles disclosed herein comprises at least one planetary drive gear, but may include more.

FIG. 7 is a cross-section diagram of a portion of a third embodiment of a micrometer 700 adapted to the principles disclosed herein. It will be understood that portions of the micrometer not shown in FIG. 7, may be implemented in some embodiments as previously described in relation to FIGS. 1 and 2, or according to other teachings found in the incorporated references and/or according to techniques generally known to one of ordinary skill in the art. In many cases, elements numbered 7XX in FIG. 7 may provide functions analogous to elements numbered XX in FIGS. 1 and 2 or 3XX in FIG. 3 or 5XX in FIGS. 5A and 5B, and may be understood by analogy such that only significant differences are described herein. It will be appreciated that FIG. 7 is a partially schematic representation of the illustrated elements. For example, some of the gaps between elements are exaggerated to ease the recognition of the various elements; whereas, in an actual device, there may be a sliding interface or bearing between the elements to provide precise alignment and stability and smooth operation. Similarly, sealing and vent features and some elements included in the spindle driving mechanism 5 shown in FIG. 2 have not been included in order to better illustrate and emphasize the novel features of the invention. However, it will be appreciated that such elements may be included in an actual device.

As shown in FIG. 7, the illustrated portion of the micrometer 700 comprises a spindle 703 with an attached engagement member 713, a frame 704 including a slot 715A, a linear displacement sensor 706 which reads the position of a scale 731 mounted to the spindle 703, an externally threaded spindle drive 716 that includes an external spindle drive thread 716A and that is joined to and turned by a spindle drive gear 796, planetary drive gears 797A, 797B, and 797C (not visible), a ring gear 798, a thimble 717, and an end cap 727. The thimble 717 includes a flange 717' which allows the thimble to be retained by a retaining ring 710. The linear displacement sensor 706 may comprise a capacitive, inductive, or optical position sensor with a cooperative scale 731. The ring gear 798 is fixed relative to the frame 704 in this embodiment such that it does not rotate, and it surrounds and mates to the planetary drive gears 797A, 797B, and 797C. The planetary gears mate to the spindle drive gear 796 on the end of the spindle drive 716. The planetary drive gears 797A, 797B, and 797C are mounted on axles 799A, 799B, and 799C, respectively, which are fixed to the end cap 727 in this embodiment. The thimble 717 generally surrounds the spindle drive 716, the planetary drive gears 797A, 797B, and 797C, and the ring gear 798. The end cap is fixed to or integral with the thimble 717 such that the planetary drive gear axles 799A, 799B, and 799C and the planetary drive gears 797A, 797B, and 797C are forced to follow a circular path as the thimble 717 and end cap 727 rotate. Since the planetary drive gears 797A, 797B, and 797C mate to the fixed ring gear 798, this forces the planetary drive gears to rotate about their axles, and this planetary drive gear rotation drives the mating spindle drive gear 796 which rotates the attached spindle drive 716.

The spindle drive 716 comprises spindle drive threads 716A (e.g., as provided by a spiral groove) which mate to and drive the engagement member 713 to drive the spindle 703 in a manner analogous to that previously described.

In the embodiment shown in FIG. 7, the spindle drive 716 includes an external spindle drive thread 716A to engage and drive an element attached to the spindle 703 (e.g., the engagement member 713). It will be appreciated that in various embodiments disclosed herein, although the spindle drive thread X16A is illustrated as spiral groove and the engagement member X13 of the spindle is illustrated as a mating pin, the spiral groove X16A may be replaced by any operable screw thread form, and the engagement member X13 may be replaced by a mating operable screw thread form, or the like.

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. A micrometer drive configuration for a handheld micrometer, comprising:
   a frame;
   a spindle;
   a linear displacement sensor that senses a displacement of the spindle;
   a threaded spindle drive, wherein the threaded spindle drive is attached to a spindle drive gear;
   a planetary drive gear that mates to the spindle drive gear;
   a ring gear surrounding and mating to the planetary drive gear; and
   a thimble generally surrounding the spindle drive gear, the planetary drive gear, and the ring gear,
   wherein:
      the thimble is coupled to drive the spindle drive gear through the planetary drive gear, and
      the planetary drive gear is sized and mounted such that the spindle drive gear turns faster than the thimble.

2. The micrometer drive configuration of claim 1, wherein:
   the ring gear is coupled to the thimble and rotates at the rate of the thimble; and
   the planetary drive gear is fixed to the frame at a rotary axis of the planetary drive gear.

3. The micrometer drive configuration of claim 2, wherein the thimble and the spindle drive gear operate at a 5:1 gear ratio.

4. The micrometer drive configuration of claim 1, wherein:
   the ring gear is fixed to the frame; and
   a rotary axis of the planetary drive gear is coupled to the thimble and rotates at the rate of the thimble.

5. The micrometer drive configuration of claim 4, wherein the thimble and the spindle drive gear operate at a 6:1 gear ratio.

6. The micrometer drive configuration of claim 1, wherein:
   the spindle drive comprises threads with a lead angle $\lambda$ and a thread angle $\alpha_n$ measured relative to the normal;
   the spindle drive threads and an engaging member that drives the spindle exhibit an effective coefficient of static friction $\mu$; and
   the lead angle $\lambda$, the thread angle $\alpha_n$, and the effective coefficient of static friction $\mu$ satisfy the relation: $\mu > \cos \alpha_n \tan \lambda$.

7. The micrometer drive configuration of claim 1, wherein the spindle drive includes external threads that drive the spindle.

8. The micrometer drive configuration of claim 1, wherein the spindle drive includes internal threads that drive the spindle.

* * * * *